United States Patent [19]

Lucatorto et al.

[11] Patent Number: 4,634,864
[45] Date of Patent: Jan. 6, 1987

[54] ULTRASENSITIVE METHOD FOR MEASURING ISOTOPE ABUNDANCE RATIOS

[75] Inventors: Thomas B. Lucatorto, Washington, D.C.; Charles W. Clark, Gaithersburg, Md.; Tom J. Whitaker, Kennewick, Wash.

[73] Assignee: Atom Sciences, Inc., Oak Ridge, Tenn.

[21] Appl. No.: 546,052

[22] Filed: Oct. 27, 1983

[51] Int. Cl.$^4$ .............................................. B01D 59/44
[52] U.S. Cl. .................................. 250/282; 250/288; 250/423 P; 423/2
[58] Field of Search .................... 250/423 P, 288, 281, 250/282; 423/DIG. 2, 2

[56] References Cited

U.S. PATENT DOCUMENTS

| | | | |
|---|---|---|---|
| 4,020,350 | 4/1977 | Ducas | 250/281 |
| 4,115,078 | 9/1978 | Jannes et al. | 250/423 P |
| 4,166,219 | 8/1979 | Ausschmitt et al. | 250/423 P |
| 4,442,354 | 8/1984 | Hurst et al. | 250/423 P |

OTHER PUBLICATIONS

"Laser Spectroscopy for Sensitive Detector", Whitaker et al., *Proceedings of SPIE-The International Soc. for Optical Eng.*, Apr. 23-24, 1981.

*Primary Examiner*—Bruce C. Anderson
*Attorney, Agent, or Firm*—Pitts and Brittian

[57] ABSTRACT

An ultrasensitive mass spectrometry method based on multiphoton sub-Doppler resonance ionization is used to measure abundance sensitivities. The method preferentially ionizes a selected isotope in a sample by using Doppler-free resonant multiphoton ionization to produce an enhanced ratio of selected isotopes. As necessary or desired, selected isotope ions are preferentially ionized by using a second Doppler-free resonant multiphoton ionization to provide an additional isotope enhancement. The ions produced are injected into a mass spectrometer (24). Isotopic spectrum analysis of the ions is performed by the spectrometer (24) and the ions are then detected by a detector (26) such as a particular photon multiplier capable of observing a single ion. In one embodiment, at least one of the steps of preferentially ionizing the selected isotope is accomplished by two counter propagating laser beams of slightly different frequencies.

28 Claims, 3 Drawing Figures

ULTRASENSITIVE METHOD FOR MEASURING ISOTOPE ABUNDANCE RATIOS

TECHNICAL FIELD

This invention relates to an ultrasensitive method for measuring isotope abundance ratios and includes the step of performing the Doppler-free resonant multiphoton ionization of sample atoms/molecules.

BACKGROUND ART

A number of significant applications require measurement of extremely low abundances of a particular isotope. For example, it is necessary to measure extremely low abundances of a particular isotope in archeology dating where radioactive species are used as chronometers. Often $^{14}C$ is used for such dating. Measurement of low abundances is also used in geology and cosmology where $^{10}Be$ is used as a tracer. Moreover, selected tracer isotopes are used in biological and industrial applications and in the detection of fission-product isotopes for environmental monitoring. Often such applications require instrument sensitivities which will allow measurements of ratios as small as 1 part in $10^{16}$. An instrument capable of measuring such an abundance ratio would have an abundance sensitivity which exceeds $10^{16}$. This abundance sensitivity is the quantity that defines a mass spectrometry's ability to measure a given abundance ratio of two neighboring isotopes of an element in the middle of the periodic table.

Three known techniques are presently used in measuring extremely low isotope abundance ratios. In one technique, a conventional mass spectrometer employs electric and magnetic fields to perform the mass selection. In another technique, high energy (MeV) mass spectrometry is used in conjunction with a tandem accelerator. Moreover, radioactive counting can be employed. Conventional mass spectrometers are not generally capable of abundance sensitivities beyond $10^9$, and frequently cannot achieve such sensitivities because of isobaric and molecular interferences. Certain high energy spectrometers are presently capable of abundance sensitivity measurements in the range of $10^{16}$ for certain light elements for example, $^{14}C$ and $^{36}Cl$. These spectrometers prove useful for providing ultrasensitive measurements on a significant group of elements. However, the tandem accelerator-based spectrometers have several disadvantages. First, only elements having a negative ion bound state can be measured. Additionally, the ability to discriminate between isobars decreases markedly for elements having an atomic number greater than forty. This ability to discriminate between isobars is also ineffective for a certain class of elements regardless of the atomic number. Further, such spectrometers are costly to build, operate and maintain. Conventional radioactivity counting has a major draw back in that it can not be applied to the rare stable isotopes of interest and becomes impractical for small samples of long-lived nuclides.

Recently, a new technique of mass spectrometry commonly referred to as resonance ionization mass spectrometry or "RIMS", has been demonstrated successfully. Such technique is referred to in the *International Journal of Mass Spectrometry Ion Physics*, Volume 34, pages 89-97 (1980), in an article authored by D. W. Beekman, T. A. Callcott, S. D. Kramer, E. T. Arakawa, and G. S. Hurst. This technique employs resonantly enhanced laser multiphoton ionization as the ion source for a conventional mass spectrometer. For example, see U.S. Pat. No. 3,987,302 which is incorporated by reference herein together with the above identified article. As currently conceived, RIMS has the potential to eliminate isobaric and molecular interferences. The ultimate abundance sensitivity of a RIMS apparatus is limited by the sensitivity of the mass spectrometer which is $10^9$ for conventional mass spectrometers.

Accordingly, it is an object of the present invention to provide a method for ultrahigh abundance sensitivity measurement incorporating a mass spectro-meter. Such sensitivity measurements can be made on a large group of commercially and scientifically significant elements. Another object of the present invention is to provide a method for measuring isotope abundance ratios incorporating a step of preferentially ionizing a selected isotope by using Doppler-free resonant multiphoton ionization. It is also an object of the present invention to provide such an ultrahigh abundance sensitivity process capable of determining an abundance ratio of 1 part in $10^{12}$.

DISCLOSURE OF THE INVENTION

In accordance with various features of the invention, a process is provided for measuring ultrahigh abundance sensitivities. The method or process can be used for measuring the isotope abundance ratio between a selected isotope and at least one other isotope having a different atomic mass or mass number. The process includes the steps of producing a vapor of certain atoms/molecules of a sample of a chemical element being analyzed. A selected isotope is preferentially ionized by using Doppler-free resonant multiphoton ionization to produce an enhanced ratio of selected isotopes. As is necessary or desired, the selected isotope ions are preferentially ionized by a second Doppler-free resonant multiphoton ionization to provide additional isotope enhancement. The ions produced are injected into a mass spectrometer and an isotopic separation is performed. The ions are then detected in the preferred embodiment by a particle multiplier capable of observing a single ion.

BRIEF DESCRIPTION OF THE DRAWINGS

The above mentioned features of the present invention will be more clearly understood from consideration of the following description together with the accompanying drawings in which.

BEST MODE FOR CARRYING OUT THE INVENTION

Figure 1:
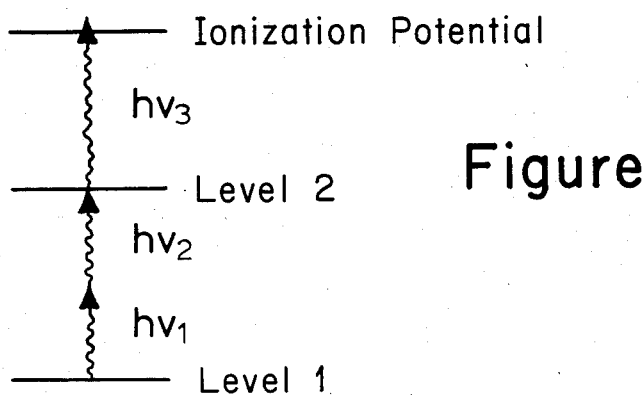
FIG. 1 illustrates the relevant energy levels of an atom or molecule including an isotope for which an abundance ratio is to be determined.

Referring now to the drawings, FIG. 1 illustrates selected energy levels of an atom or molecule during multiphoton ionization. Such ionization can be accomplished by a system generally indicated at 10 in FIG. 2.

This system 10 is designed for making ultrahigh abundance sensitivity measurements for a large group of commercially and scientifically important elements. A sample element is illustrated at 12 in FIG. 2. This sample includes atoms and/or molecules containing a selected isotope for which an abundance sensitivity measurement is to be made. The abundance ratio between a selected isotope and at least one other isotope having a different atomic mass or mass number in the sample 12 of a given chemical element can be measured by the present process up to ratios of 1 part in $10^{12}$. This sample can be a solid, liquid or gas as will be discussed in greater detail hereinafter. For a solid sample, an energetic beam, an argon ion beam for example, can be directed against the sample 12 to sputter neutral atoms/molecules 14 from the sample in an ultrahigh vacuum. Secondary ions are electrostatically rejected from the region above the sample surface. Thus, a cloud of much more abundant neutral sample atoms 12 remain. The vapor or cloud of selected atoms/molecules of the sample is then analyzed. This sputtering techique is described in greater detail in co-pending U.S. patent application Ser. No. 341,895 filed on Jan. 22, 1982 and entitled "Sputter Initiated Resonance Ionization Spectrometry", which is incorporated by reference herein. This sputtering technique can be used to operate on samples which are liquid or solid at normal temperature. The sample can also be vaporized by heating in an appropriate oven or by laser ablation [See S. Mayo, et al. Anal. Chem. 54, 553–556 (1982)]. For obtaining the highest isotopic abundance sensitivities it is preferred that the sample 12 be chemically purified. Moreover, the element to be measured is preferably a major constituent of the sample.

The resonant response of an atom to a radiation field can be made independent of the velocity of the atom, i.e. the resonant response is Doppler-free. In this connection the radiation field is chosen in such a way that the overall velocity-induced Doppler-shift associated with the resonance is zero. FIG. 1 illustrates the energy levels of an atom which is in two-photon resonance with the radiation field. This resonance is obtained when the energy of the excited atom is equal to $2\,h\nu$ where h is Planck's constant and $\nu$ is the frequency of the radiation. The resonance will be Doppler-free if the atom absorbs one photon from each of two-counter-propagating laser beams 16–18 illustrated in FIG. 2 with $h\nu_1 + h\nu_2 = 2h\nu$ and $\nu_1$ equal to or nearly equal to $\nu_2$. It will be noted that the beam frequencies are depicted. The resonance is Doppler-free because the Doppler-shift of the atom relative to one of the counter-propagating beams is cancelled to the first order by the Doppler-shift of the atom relative to the other laser beam.

First, the process of the present invention employs a two-photon Doppler-free transition since for most vapors the Doppler-shift of single-photon transitions is comparable to or greater than the isotope shift. Moreover the presence of a Doppler-shift means that only a small subgroup of atoms having a narrowly defined velocity can be resonant with a narrow bandwidth laser at any given laser frequency. The first effect severely limits the isotopic enhancement factor achievable in a resonantly enhanced multiphoton ionization which is not Doppler-free. The second effect severely limits the sensitivity of the entire system.

To ensure maximum isotopic selectivity for the Doppler-free process, non-resonant isotopes must be prevented from undergoing a two-photon transition to the excited state. Such a certain velocity of non-resonant isotopes are fortuitously Doppler-shifted into resonance with one of the laser beams. This prevention can be accomplished by two methods. First, if the initial state of the atom/molecule is a state of zero orbital momentum (an "S" state) and the excited state is also a "S" state, then the absorption of two photons from one beam will be prevented when both beams are circularly polarized. The absorption of a single photon from each beam is allowed if the two beams are circularly polarized with the same helicity. Such prevention can also be accomplished by using two slightly different frequencies, $\nu_1$ and $\nu_2$, such that $h\nu_1 + h\nu_2$ is the energy of the excited state and the absolute value of $\nu_1 - \nu_2$ is somewhat larger than the Doppler width associated with the frequency $\nu_1$. This method applies in all cases.

The multiphoton ionization process is completed by the addition of one or more photons. FIG. 1 shows the addition of one photon of frequency $\nu_3$, but additional resonant photons can be used if the ionization potential is not within the reach of a conventionally available frequency $\nu_3$.

Figure 2:
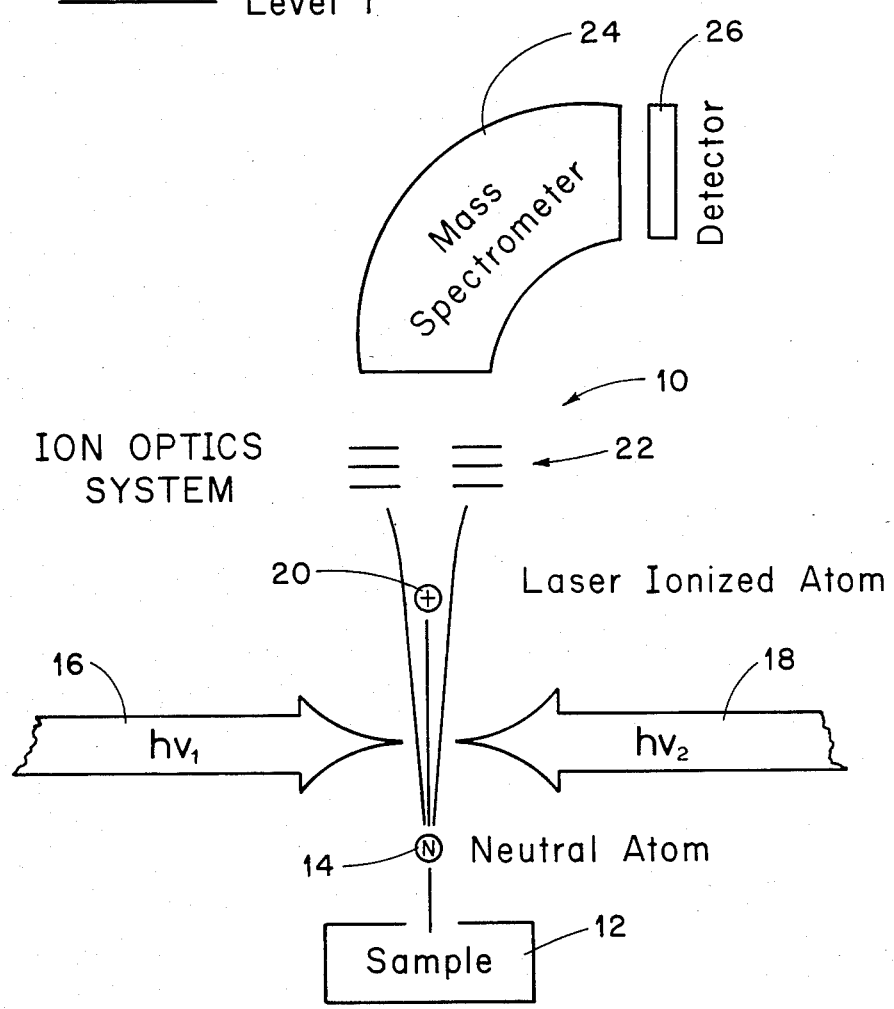
FIG. 2 illustrates a schematic diagram of the various components used in accomplishing the process of the present invention. This figure illustrates a single-stage version of the process.

The laser ionized atom/molecule 20 illustrated in FIG. 2 is extracted from the laser-atom interaction region. The system of ion injection optics illustrated generally at 22 serves to efficiently extract the ions and to accelerate and focus the ions in a suitable manner for the mass spectrometer. As necessary or desired the ions are also colliminated prior to being injected into the mass spectrometer. Such technology is conventional and well known by those skilled in the art.

The mass spectrometer 24 is of conventional design. Suitable conventional mass spectrometers such as the magnetic sectors, the quadrupole or the time of flight can be used. This spectrometer 24 has an abundance sensitivity of a least $10^7$, which is a value readily available on many commercial spectrometers. Further, the detector 26 is of conventional design and commercially available. Preferably it is a charged particular multiplier capable of counting single atoms.

Figure 3:
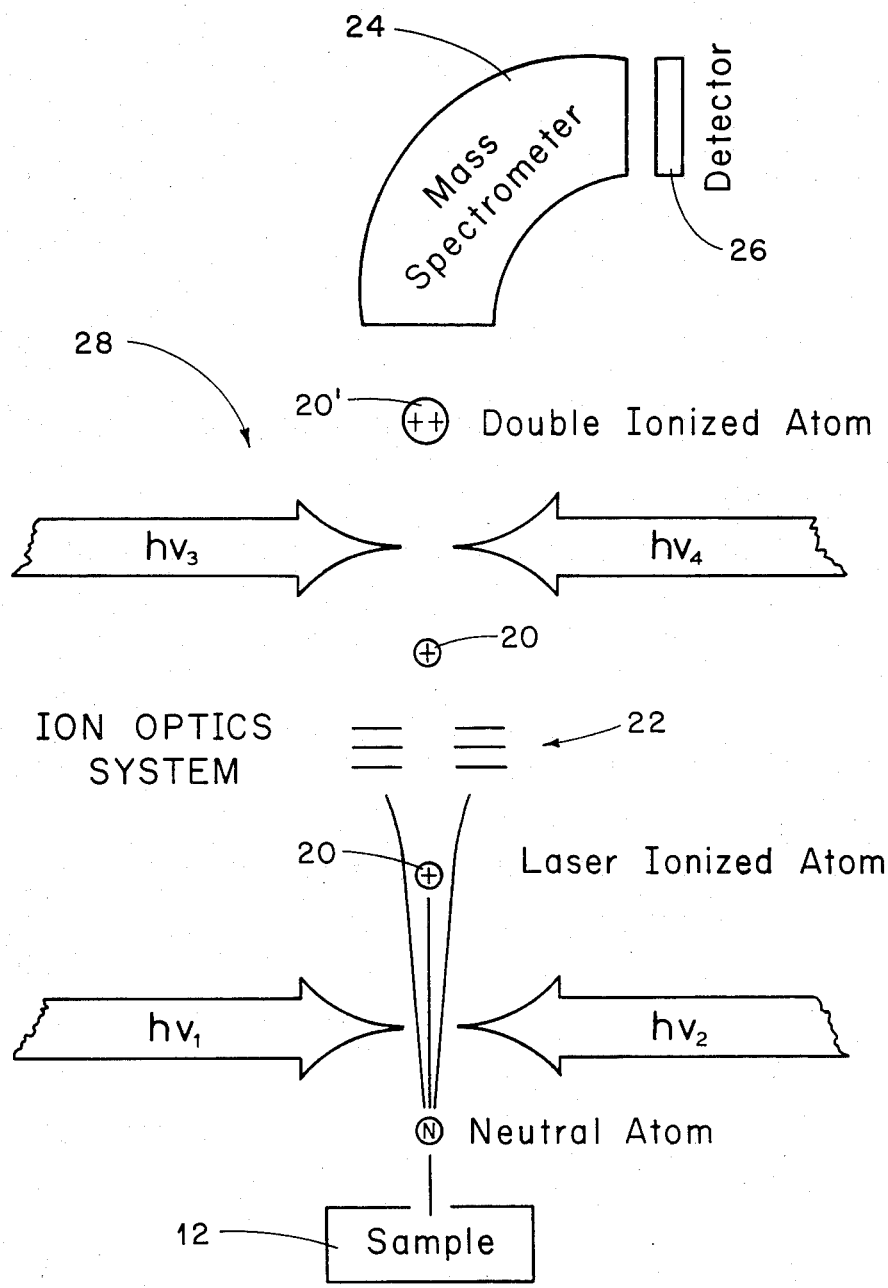
FIG. 3 represents a double-stage version of the process in which selected isotope ions produced by the process associated with FIG. 2 are preferably ionized by a second Doppler-free resonant multiphoton ionization to provide an additional isotope enhancement.

For many of the elements of the periodic table, for example Ca, Sr, Ba, Lu, Ce, Nd, Th, Pa, and U a resonant multiphoton ionization on a singly-charged ion can be used to produce the doubly-charged ion. This procedure is illustrated schematically in FIG. 3. FIG. 3 depicts the second stage of ionization generally indicated at 28 to produce the double ionized atom 20'. This second stage of ionization is accomplished in a Doppler-free mode in order to produce an additional enhancement of the selected isotope into the doubly-charged state 20'. If the mass spectrometer 24 is set for exactly half the mass of the selected isotope, then the isotopic abundance sensitivity for this isotope is the product of the enhancement factors of each ionization stage multiplied by the abundance sensitivity of the mass spectrometer. Often the enhancement factor of the second ionization stage is comparable to that of the first, resulting in significant contribution to the overall isotopic abundance sensitivity by the additional stage 28. Thus, the single stage process illustrated in FIG. 2 preferentially ionizes a selected isotope by using Doppler-free resonant multiphoton ionization to produce an enhanced ratio of selected isotopes. The two stage process illustrated in FIG. 3 includes a further stage of preferentially ionizing selected isotope ions by using a second Doppler-free resonant multiphoton ionization to provide an additional isotope enhancement.

From the foregoing detailed description, it will be recognized that an ultrasensitive method has been provided for measuring the abundance sensitivity of samples containing selected isotopic species. The method incorporates the step of preferentially ionizing selected isotopic species with a laser. A system of ion optics is used to inject the laser-produced ions into a mass spectrometer and the ions are detected with a particle multiplier. The ions are created by Doppler-free resonant multiphoton ionization. The Doppler-free resonant process exploits the optical isotope shift to enhance the number of ions of a selected isotope. The laser-produced ions are analyzed by the mass spectrometer. The total abundance sensitivity is obtained from the product of the enhancement factor multiplied by the abundance sensitivity of the mass spectrometer. Enhancement factors of $10^5$ are achievable, which when multiplied by the abundance sensitivity of $10^7$ obtainable with a conventional mass spectrometer, produce an overall attainable abundance sensitivity of $10^{12}$. All atoms in a gaseous sample being analyzed are resonant with the laser when the Doppler-free mode is used. This feature provides the ultimate sensitivity for the ionization process in a mass spectrometer since in principle every atom of a selected species in the sample can be ionized. The process works with a sample including molecules or atoms. Counter propagating beams can orginate from the same laser. Moreover, a second laser can be used for the second stage of ionization. The lasers can be synchronously pulsed, operated in a mode to produce a continuous radiation output or a combination thereof. The initial energy level of the atoms/molecules of the vaporized sample can be the ground state of the atoms/ molecules or it can be greater than the ground energy level.

While a preferred embodiment has been shown and described, it will be understood that there is no intent to limit the invention by such disclosure, but rather it is intended to cover all modifications and alternate constructions falling within the spirit and the scope of the invention as defined in the appended claims.

We claim:

1. A method for measuring the isotope abundance ratio between a selected isotope and at least one other isotope having a different atomic mass or mass number, in a sample of a given chemical element, said abundance measuring method being capable of determining isotope abundance ratios of at least one part in $10^{12}$ with an overall abundance sensitivity exceeding $10^{16}$, comprising the steps of:
    producing a vapor of certain atoms/molecules of said sample of said chemical element;
    preferentially ionizing a selected isotope within said vapor by using Doppler-free resonant multiphoton ionization to produce an enhanced ratio of said selected isotope, said ionization being laser induced;
    in an additional step preferentially ionizing said selected isotope from said first ionization step by using Doppler-free resonant ionization to produce an additional isotope enhancement, said additional step of ionization being laser induced;
    injecting ions produced by said additional step of ionization into a mass spectrometer;
    performing isotopic separation of said ions by said mass spectrometer; and
    detecting ions from said isotopic separation to determine said isotope abundance ratio.

2. The method of claim 1 wherein said sample includes molecules containing atoms of said selected isotope.

3. The method of claim 1 wherein said laser second produces a circularly polarized counter-propagating beam thereby preventing ionization of a non-resonant isotope fortuitously Doppler-shifted into resonance by said laser.

4. The method of claim 1 wherein of said steps of preferentially ionizing selected isotopes and ions is accomplished by two-counter propagating laser beams of slightly different frequencies whereby ionization for any velocity subgroup of non-resonant isotope is prevented.

5. The method of claim 1 1 wherein ionization is accomplished by two counter propagating beams originating from the same laser.

6. The method of claim 1 wherein said laser-induced preferential ionization of a selected isotope is performed using Doppler-free resonant multiphoton ionization by at least one laser producing two-photon excitation, and wherein said second Doppler-free resonant multiphoton ionization is accomplished by at least one additional laser.

7. The method of claim 6 wherein said lasers are sychronously pulsed.

8. The method of claim 6 wherein at least one laser is synchronously pulsed and at least one laser produces a continuous radiation output.

9. The method of claim 1 wherein all of said lasers produce a continuous output of radiation.

10. The method of claim 1 wherein the initial energy level of the atoms/molecules of the vaporized sample is the ground state of said atoms/molecules.

11. The method of claim 1 wherein the initial energy level of the atoms/molecules is greater than the ground energy level of said atoms/molecules.

12. The method of claim 1, wherein said ions are detected by a particle multiplier capable of observing single ions from said isotopic separation.

13. A method for measuring the isotope abundance ratio between a selected isotope and at least one other isotope having a different atomic mass or mass number in a sample of a given chemical element, said abundance ratio measurement method being capable of determining an abundance ratio of at least 1 part in $10^{12}$, comprising the steps of:
    producing a vapor of certain atoms/molecules of said sample of said chemical element;
    preferentially ionizing a selected isotope within said vapor by using Doppler-free resonant multiphoton ionization to produce an enhanced ratio of said selected isotope, said ionization being laser induced;
    preferentially ionizing slected isotope ions from said first ionization by using a second Doppler-free resonant multiphoton ionization induced by a laser beam to provide an additional isotope enhancement;
    injecting ions produced by said second ionization into a mass spectrometer; and
    detecting ions from said mass spectrometer by a particle multiplier capable of observing a single ion.

14. The method of claim 13 wherein said sample includes molecules containing atoms of said selected isotope.

15. The method of claim 13 wherein ionization is accomplished by two-counter propagating beams originating from the same laser.

16. The method of claim 13 wherein said lasers are synchronously pulsed.

17. The method of claim 16 wherein at least one laser is synchronously pulsed and at least one laser produces a continuous radiation output.

18. The method of claim 13 wherein all of said lasers produce a continuous output of radiation.

19. The method of claim 13 wherein the initial energy level of the atoms/molecules of the vaporized sample is the ground state of said atoms/molecules.

20. The method of claim 13 wherein the initial energy level of the atoms/molecules is greater than the ground energy level of said atoms/molecules.

21. The method of claim 1 wherein a single laser produces a circularly polarized counter-propogating beam thereby preventing ionization of a non-resonant isotope fortuitously Doppler-shifted into resonance by said laser.

22. The method of claim 1 wherein said step of preferentially ionizing said selected isotopes and ions is accomplished by two counter propogating laser beams of slightly different frequencies whereby ionization for any velocity subgroup of non-resonant isotopes is prevented.

23. The method of claim 1 wherein said ionization steps are accomplished by two counter propogating beams originating from the same laser.

24. The method of claim 1 wherein said laser-induced preferential ionization of a selected isotope is performed using Doppler-free resonant multiphoton ionization by at least one laser producing two photon excitation.

25. The method of claim 1 wherein all of said lasers produce a continuous output of radiation.

26. The method of claim 1 wherein the initial energy level of said atoms/molecules in said vapor is the ground state of said atoms/molecules.

27. The method of claim 1 wherein the initial energy of said atoms/molecules in said vapor is greater than the ground level energy of said atoms/molecules.

28. The method of claim 1 wherein said ions from said isotope separation are detected using a particle multiplier capable of observing single ions.

* * * * *